Aug. 5, 1969          A. BAUS ET AL          3,459,624
ARTIFICIAL TREE BRANCH
Filed May 25, 1966
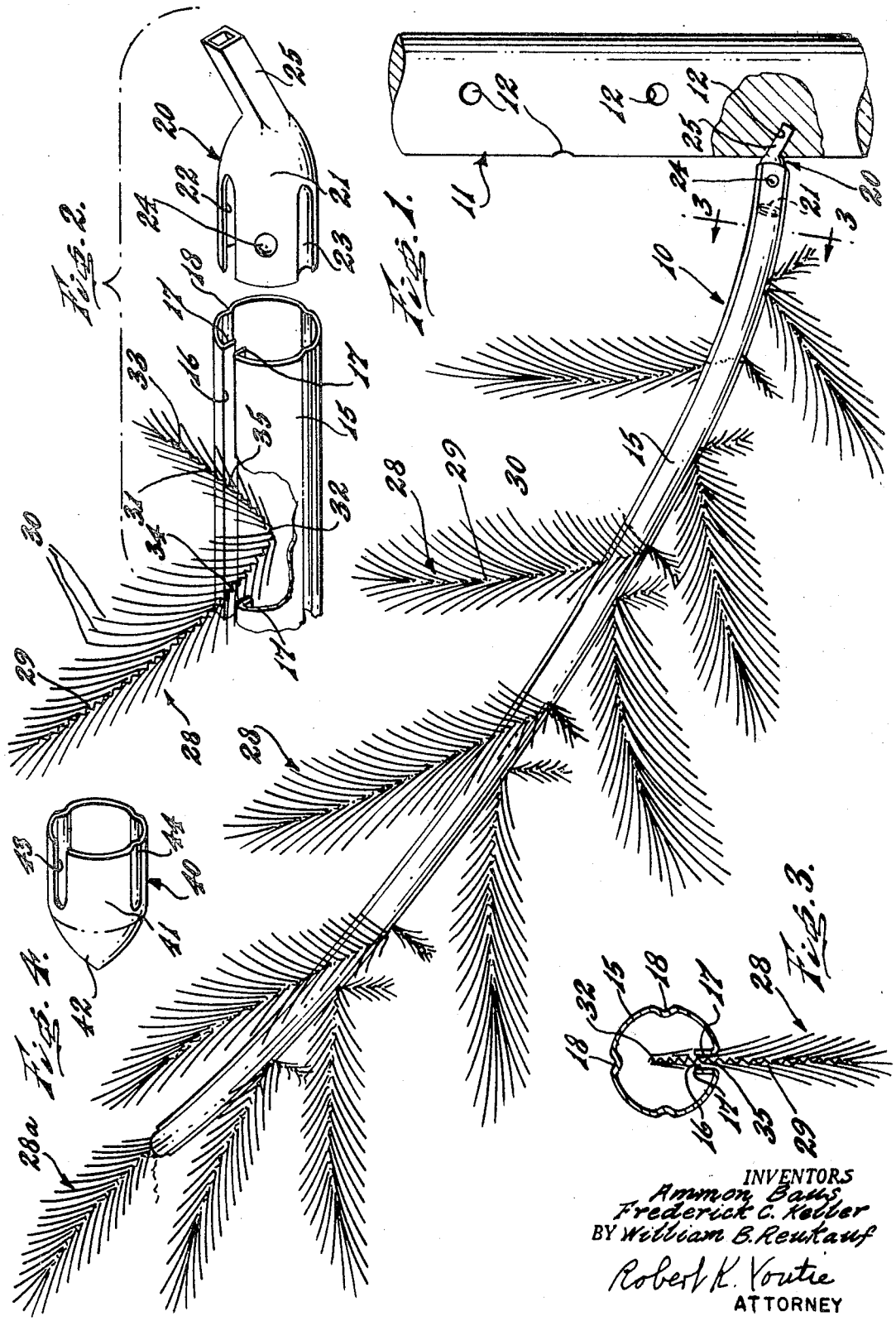
INVENTORS
Ammon Baus,
Frederick C. Keller
BY William B. Reukauf
Robert K. Youtie
ATTORNEY United States Patent Office 3,459,624
Patented Aug. 5, 1969

3,459,624
ARTIFICIAL TREE BRANCH
Ammon Baus, Philadelphia, and Frederick C. Keller, Cornwells Heights, Pa., and William B. Reukauf, Haddonfield, N.J., assignors Carey-McFall Company, Philadelphia, Pa., a corporation of Pennsylvania
Filed May 25, 1966, Ser. No. 552,748
Int. Cl. A47g 33/06
U.S. Cl. 161—24       7 Claims This invention relates to improvements in artificial plants, and is especially concerned with artificial tree-branch constructions, and the like.

As is well known to those versed in the art, the production of artificial plants and trees has greatly increased of late, including the production of simulated or artificial Christmas trees. Heretofore, in order to obtain lifelike simulations it has been necessary to employ considerable manual labor or hand work in the manufacture and assembly of artificial plants and trees, causing high manufacturing costs and relatively high retail prices. Prior attempts to mechanism to automate the production of artificial plants and trees, in efforts to reduce manufacturing costs, have detracted from the natural and lifelike appearance of the resulting products.

Accordingly, it is an important object of the present invention to provide a unique construction of artificial tree which accurately simulates the appearance of natural trees, and which is capable of manufacture by mass-production techniques to effect considerable savings in manufacturing costs.

It is a further object of the present invention to provide an artificial tree construction having the advantageous characteristics mentioned in the preceding paragraph, which is extremely simple in design, requiring a minimum of parts, capable of quick and easy assembly, either by the seller or buyer, and which is durable throughout a long useful life.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a partial elevational view showing an artificial tree branch constructed in accordance with the teachings of the present invention, partly in section for clarity;

FIGURE 2 is an exploded perspective view showing component parts of the artificial branch of FIGURE 1, partly broken away;

FIGURE 3 is a transverse sectional view taken generally along the line 3—3 of FIGURE 1; and FIGURE 4 is a perspective view illustrating an element for optional use in conjunction with the instant artificial branch construction.

Referring now more particularly to the drawings, and specifically to FIGURE 1 thereof, a branch is there generally designated 10, and illustrated as projecting transversely from a simulated tree trunk 11. The trunk 11 may be formed of a wooden rod, or other suitable material, provided with a plurality of blind holes 12, say drilled obliquely downward into the rod.

The branch 10 includes an elongate tube 15, say fabricated of resilient sheet material, strip stock, or other suitable material, and rolled or otherwise formed into an elongate open-ended tubular configuration. The tube 15 is provided longitudinally therealong with an elongate slot 16 coextensive with and opening through opposite open ends of the tube. That is, the slot 16 communicates from externally of the tube 15 radially inward of the hollow interior thereof. Extending along each edge of slot 16, preferably longitudinally coextensive therewith, is an inturned lip or flange 17. The tube 15 may be rolled of strip material and its longitudinal edge margins bent, in the rolling operation, to define the radially inwardly projecting lips 17.

As best seen in FIGURES 2 and 3, the lips 17 project generally radially inward of the tube 15, and are in facing, spaced relation with respect to each other. If desired, the tube may be further formed with longitudinally extending grooves or flutes 18 spaced circumferentially thereabout, say in the rolling operation. The grooves or flutes 18 effect increased rigidity of the tube 15, enabling the desired rigidity to be obtained with lighter stock, and further serve to enhance the natural, lifelike appearance of the tube as a branch. As best seen in FIGURE 2, the flutes 18 may be coextensive with the tube, terminating at the open ends thereof.

It will also be apparent that the inturned flanges or lips 17 serve to increase the longitudinal rigidity or stiffness of the tube 15, in addition to other functions which will be described more fully hereinafter. In use, the tube 15 is advantageously bent into a longitudinally extending arcuate configuration, as seen in FIGURE 1, preferably with the groove 16 on the radially outer side of the bend.

An endpiece, closure or plug, generally designated 20, is configured for conformable insertion into one open end of the tube 15. The plug 20 may include a generally cylindrical body 21, either solid or hollow, as desired and formed with a cut or notch 22 extending longitudinally inwardly from one end of the body 21. At circumferentially spaced locations about the body 21 of end fitting 20, there may be formed longitudinally extending recesses or grooves 23, also opening outward through the body end. By this configuration, the end-fitting body 21 is snugly insertable into an end of tube 15 with the flanges or lips 17 engaged in notch 22 and the flutes 18 engaged in recesses 23. This conformably engaging insertion of end-fitting body 21 into the adjacent end of tube 15 serves to nonrotatably connect the tube to the end fitting, while retaining the groove 16 against undue spreading or opening. If desired, the body 21 may be provided with an external recess 24, and the wall portion of tube 15 overlying the recess may be staked or depressed into the recess for effective retention of the end fitting on the tube.

Remote from the notch 22 and grooves 23, the body 21 may be provided with an extension or shank 25, say of rectangular or other noncircular configuration and extending generally oblique to the body 21. Further, the shank 25 extends obliquely toward the side of body 21 formed with notch 22, for a purpose appearing presently.

A plurality of twigs are shown in FIGURE 1 and each generally designated 28. The twigs may be of any suitable construction, say having a flexible simulated central stem 29 and a multiplicity of leaves or needles 30 extending from the stem. In practice it has been found desirable to form each twig 28 with a stem 29 of a pair of twisted wires, the leaves or needles being formed from a chevron-cut strip of flexible sheet material, such as vinyl, having its longitudinally extending medial portion uncut and held by the twisted wires therebetween. However, other suitable twig constructions may be employed.

As best seen in FIGURE 2, the twig 28 has its inner end portion 31 bent, as at 32, in transverse or angulate relation with respect to the remainder of the twig. In this condition, the bent portion 32 is inserted radially inward through slot 16 into tube 15, leaving the terminus 33 of end portion 31, as well as the major portion of the twig exteriorly of the tube. A pair of spaced stem portions 34 and 35 are thus located in the groove 16, at spaced locations therein, and each frictionally engaged between the facing surfaces of lips 17. That is, the lips or flanges 17 firmly engage the stem portions 34 and 35 to frictionally hold the twig 28 against inadvertent or accidental removal or dislodging. Also, the twig 28 is held in the above-described manner against undesired rotation, twisting or other movement. However, the major portion of twig 28 may be bent, exteriorly of the tube 15 to extend in any desired relation away from the tube.

While the twigs 28 are desirably of a snug friction fit in the slot 16, the tube may be crimped, if desired, after insertion of the twigs to insure positive retention of the twigs in the tube.

While assembly has been described above as radially inward insertion of the twigs 29 through slot 16, it is appreciated that insertion may be through an end of the slot, if desired.

In assembly of a branch 10 with a simulated trunk 11, the extension or shank 25 is inserted obliquely downward into one of the trunk holes 12. In this condition, the slot 16 will be located on the underside of the tube 15, and the curvature of the tube will be upward. While the assembled branch 10 is gravitationally stable relative to the simulated trunk 11, the noncircular cross-sectional configuration of shank 25 further resists any possible rotation of the branch.

In FIGURE 1, the outer or distal end of tube 15 is illustrated as having a twig 28a inserted longitudinally inward through the open tube end. This affords an esthetically appealing appearance and effectively conceals the open tube end.

If desired, the distal or outer end of tube 15 may be closed by an end fitting or plug 40, see FIGURE 4, which may be generally cup-shaped in configuration having a generally cylindrical side wall 41 and one end closed by an end wall 42. The other end of side wall 41 remains open and may be provided with a longitudinally inwardly extending notch or cutout 43, as well as a plurality of longitudinally extending external recesses 44. The end closure 40 is optionally insertable in the outer open end of tube 15, with the notch 43 receiving the flanges or lips 17, and the recesses 44 receiving respective flutes 18. As with the end fitting 20, the end fitting 40 also effectively retains the slot 16 against undesired extension or opening.

If desired, the component parts described hereinbefore may be readily disassembled, and reassembled, as for repeated use at another time or place.

From the foregoing, it is seen that the present invention provides an artificial plant or tree construction which fully accomplishes its intended objects and is well adapted to meet practical conditions of manufacture, distribution and use.

What is claimed is:

1. An artificial tree branch comprising an elongate tube having a longitudinally extending slot, a pair of inturned lips extending along respective edges of said slot in facing spaced relation with each other, a plurality of artificial twigs each having its inner end region frictionally engaged in said slot and extending outwardly therefrom, said inner twig end regions each having a bend inserted inward through said slot interiorly of said tube, for frictional engagement of said lips with spaced portions of each twig, and said lips frictionally engaging said inner twig end regions.

2. An artificial branch according to claim 1, said slot opening through one end of said tube, said lips extending substantially to said one tube end, and an endpiece engaged in said one tube end and having a notch in receiving relation with said lips.

3. An artificial branch according to claim 2, said endpiece closing said one tube end.

4. An artificial branch according to claim 2, in combination with an extension on said endpiece for insertion into an artificial tree trunk.

5. An artificial branch according to claim 1, said tube having longitudinally extending reinforcing flutes.

6. An artificial branch according to claim 1, said tube being of a longitudinally extending arcuate configuration for increased rigidity.

7. An artificial branch according to claim 1, said twigs each comprising a plurality of twisted wires, and needle-simulating means interposed between said wires.

References Cited

UNITED STATES PATENTS

| | | | |
|---|---|---|---|
| 891,301 | 6/1908 | Spreen | 161—22 |
| 2,111,448 | 3/1938 | Hoffman | 52—626 |
| 3,140,219 | 7/1964 | Dick et al. | 161—24 |

ROBERT F. BURNETT, Primary Examiner

RAYMOND O. LINKER, Jr., Assistant Examiner